(12) United States Patent
Rampson et al.

(10) Patent No.: US 9,558,172 B2
(45) Date of Patent: Jan. 31, 2017

(54) LINKING VISUAL PROPERTIES OF CHARTS TO CELLS WITHIN TABLES

(75) Inventors: Benjamin Edward Rampson, Redmond, WA (US); Scott Ruble, Bellevue, WA (US); Benjamin Sklar, Kenmore, WA (US); Anupam Garg, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 603 days.

(21) Appl. No.: 12/047,310

(22) Filed: Mar. 12, 2008

(65) Prior Publication Data

US 2009/0235152 A1 Sep. 17, 2009

(51) Int. Cl.
*G06F 17/00* (2006.01)
*G06F 17/24* (2006.01)

(52) U.S. Cl.
CPC .................................. *G06F 17/246* (2013.01)

(58) Field of Classification Search
CPC ....................................................... G06F 17/246
USPC ......................................................... 715/212
See application file for complete search history.

(56) References Cited

U.S. PATENT DOCUMENTS

| | | | | |
|---|---|---|---|---|
| 5,226,118 A | * | 7/1993 | Baker et al. | 715/833 |
| 5,581,677 A | * | 12/1996 | Myers et al. | 345/440 |
| 5,721,847 A | | 2/1998 | Johnson | |
| 5,880,742 A | * | 3/1999 | Rao et al. | 345/440 |
| 6,081,809 A | | 6/2000 | Kumagai | |
| 6,282,551 B1 | * | 8/2001 | Anderson | G06F 3/0481 |
| | | | | 715/209 |
| 6,529,217 B1 | * | 3/2003 | Maguire et al. | 715/769 |
| 7,155,672 B1 | | 12/2006 | Adler et al. | |
| 7,251,776 B2 | * | 7/2007 | Handsaker et al. | 715/212 |
| 2003/0009411 A1 | | 1/2003 | Ram et al. | |
| 2004/0205523 A1 | | 10/2004 | Miller et al. | |
| 2005/0193336 A1 | | 9/2005 | Fux et al. | |
| 2005/0251735 A1 | | 11/2005 | Dunietz et al. | |

(Continued)

FOREIGN PATENT DOCUMENTS

JP H09-6566 A 1/1997
JP 2002207723 A 7/2002

(Continued)

OTHER PUBLICATIONS

"Make Smarter Organization Charts with Visio", Microsoft Corporation, 2008, pp. 6.

(Continued)

*Primary Examiner* — Amelia Tapp
(74) *Attorney, Agent, or Firm* — Thomas S. Wong; Micky Minhas

(57) ABSTRACT

Tools and techniques are described for linking visual properties of charts to cells within tables. Methods provided by these tools enable users to select visual properties that are associated with graphical displays of chart data, and to link these visual properties to respective cells within the tables. User interfaces provided by these tools may provide representations of visual properties associated with the graphical displays of chart data, with these representations of the visual properties being responsive to user input to link the cells in the tables to the visual properties. These user interfaces may also include representations of the cells that are associated with the representations of the visual properties.

18 Claims, 4 Drawing Sheets

(56) References Cited

U.S. PATENT DOCUMENTS

| | | | |
|---|---|---|---|
| 2006/0095833 A1 | 5/2006 | Orchard et al. | |
| 2006/0112123 A1 | 5/2006 | Clark et al. | |
| 2006/0136819 A1 | 6/2006 | Tolle et al. | |
| 2006/0259509 A1 | 11/2006 | Stolte et al. | |
| 2006/0288284 A1 | 12/2006 | Peters et al. | |
| 2007/0022128 A1 | 1/2007 | Rothschiller et al. | |
| 2007/0061751 A1 | 3/2007 | Cory et al. | |
| 2007/0143398 A1 | 6/2007 | Graham | |
| 2007/0174291 A1 | 7/2007 | Cooper et al. | |
| 2007/0250295 A1* | 10/2007 | Murray et al. | 703/2 |

FOREIGN PATENT DOCUMENTS

| | | | |
|---|---|---|---|
| JP | 2004501442 A | 1/2004 | |
| JP | 2004-252005 A | 9/2004 | |
| JP | 2005-217816 A | 8/2005 | |
| JP | 2005-327150 A | 11/2005 | |

OTHER PUBLICATIONS

"A Class Module to Manipulate a Chart Series", retrieved on Jan. 4, 2008 at << http://www.j-walk.com/ss/excel/tips/tip83.htm>>, pp. 1-2.
McNamara, "Charts", CPAN Search Site, downloaded Jan. 4, 2008 from http://search.cpan.org/~Jmcnamara/Spreadsheet-WriteExcel/charts/charts.pod, 6 pages.
International Search Report dated Jun. 1, 2009 in International Application No. PCT/US2009/032336.
Chinese Official Action dated May 22, 2012 in Chinese Application No. 200980108848.3.
Russian Notice of Allowance dated Nov. 26, 2013 in Russian Application No. 2010137823/08(053845).
Abstract for Russian Patent Publication No. RU2305184 (C2) published Aug. 27, 2007 in the name of Schlumberger Technology BV, 1 page.
Japanese Official Action dated Jan. 29, 2013 in Japanese Application No. 2010-550711.
Futami, Ryouji et al., "Lecture 4 of Excel Statistical Analysis for Continual Improvement, Design of Experiment II for Solving a Problem," $1^{st}$ Ed., JUSE Press, Ltd., Japan, May 31, 2002, pp. 169-181. 16 pp.
Mexican Official Action dated Mar. 13, 2013 in Mexican Application No. 2010/009896.
Mexican Official Action dated Aug. 3, 2012 in Mexican Application No. Mx/a/2010/009896.
Chinese Official Action dated Jan. 5, 2013 in Chinese Application No. 200980108848.3.
Russian Official Action dated Dec. 27, 2012 in Russian Application No. 2010137823.
Japanese Official Action dated Sep. 6, 2013 in Japanese Application No. 2011-551088.
Australian Official Action dated Oct. 16, 2013 in Australian Application No. 2009223344.
Russian Official Action dated May 14, 2013 in Russian Application No. 2010137823/08.
Taiwan Official Action and Search Report Received dated May 9, 2014 in Taiwan Patent Application No. 98103906.
Canadian Office Action for Canadian Application No. 2717292, mailed Aug. 12, 2015, a counterpart foreign application of U.S. Appl. No. 12/047,310, 6 pages.
"I want to input values of cells to a maximum and a minimum value of a numerical axis of an excel graph", [online], retrieved on Mar. 26, 2015 at <<http://oshiete.goo.ne.jp/qa/4295393.html>>, NTT Resonant Inc., Japan, Sep. 1, 2008, 4 pages.
Translated Israeli Office Action mailed Sep. 8, 2014 for Israeli patent application No. 207621, a counterpart foreign application of U.S. Appl. No. 12/047,310, 8 pages.
Translated Japanese Office Action mailed Apr. 1, 2015 for Japanese patent application No. 2013-268583, a counterpart foreign application of U.S. Appl. No. 12/047,310, 6 pages.
Japanese Office Action Received for Japanese Patent Application No. 2013-268583, Mailed Dec. 1, 2014, 6 Pages.
Korean Office Action received for Korean Patent Application No. 10-2010-7022255, Mailed Dec. 23, 2014, 4 Pages.
Dodge, et al., "Link of user setting property to cell", Microsoft Office Excel 97 Official Manual, Japan, ASCII Corporation, Jun. 1, 1997, 1st edition, p. 72, 5 pages.
Dode, "Linking user setting property to cell", Microsoft Office Excel 2003 Official Manual, Japan, Nikkei BP Soft Press, Inc., Jul. 12, 2004, 1st edition, p. 38, 5 pages.
"How can I enter call values as the maximum and minimum scale values on Y/numeric axis scale?", retrieved on Nov. 10, 2015 at <<http://okwave.jp/qa/q1934112.html, posted on Feb. 3, 2006, 12 pages.
Translated Copy of the Japanese Office Action mailed Nov. 17, 2015 for Japanese patent application No. 2013-268583, a counterpart foreign application of U.S. Appl. No. 12/047,310, 15 pages.
The Malaysian Office Action mailed Jul. 15, 2015 for Malaysian patent application No. PI2010003969, a counterpart foreign application of U.S. Appl. No. 12/047,310, 3 pages.
"When the input value in the (Excel VBA2003) cell changes, a process is initiated", retrieved on Nov. 10, 2015 at <<http://blog.livedoor.jp/katsuyausami/archives/51278693.html>>, 6 pages.
Office Action from Canadian Patent Office for Application No. 2717292, mailed Feb. 24, 2016, a counterpart foreign application on U.S. Appl. No. 12/047,310, 7 pages.
Translated Office Action from Israeli Patent Office for Application No. 207621, mailed Feb. 23, 2016, a counterpart foreign application on U.S. Appl. No. 12/047,310, 11 pages.
The Canadian Office Action mailed Aug. 19, 2016 for Canadian patent applicatoin No. 2717292, a counterpart foreign application of U.S. Appl. No. 12/047,310, 6 pages.
Translated the Japanese Office Action mailed May 27, 2016 for Japanese Patent Application No. 2013-268583, a counterpart foreign application of U.S. Appl. No. 12/047,310, 6 pages.

* cited by examiner

LINKING VISUAL PROPERTIES OF CHARTS TO CELLS WITHIN TABLES

BACKGROUND

Spreadsheet applications enable users to visualize relationships between any number of different numerical data items. For example, spreadsheet applications may generate charts, graphs, or other visualizations of underlying data contained within a spreadsheet. As the complexity of these relationships and the underlying numerical data continues to increase, users may wish to adjust or customize the visualizations of this underlying data.

SUMMARY

Tools and techniques are described for linking visual properties of charts to cells within tables. Methods provided by these tools enable users to select visual properties that are associated with graphical displays of chart data, and to link these visual properties to respective cells within a table. User interfaces provided by these tools may provide representations of visual properties associated with the graphical displays of chart data, with these representations of the visual properties being responsive to user input to link the cells in the chart data to the visual properties. These user interfaces may also include representations of the cells that are associated with the representations of the visual properties.

The above-described subject matter may also be implemented as a method, computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
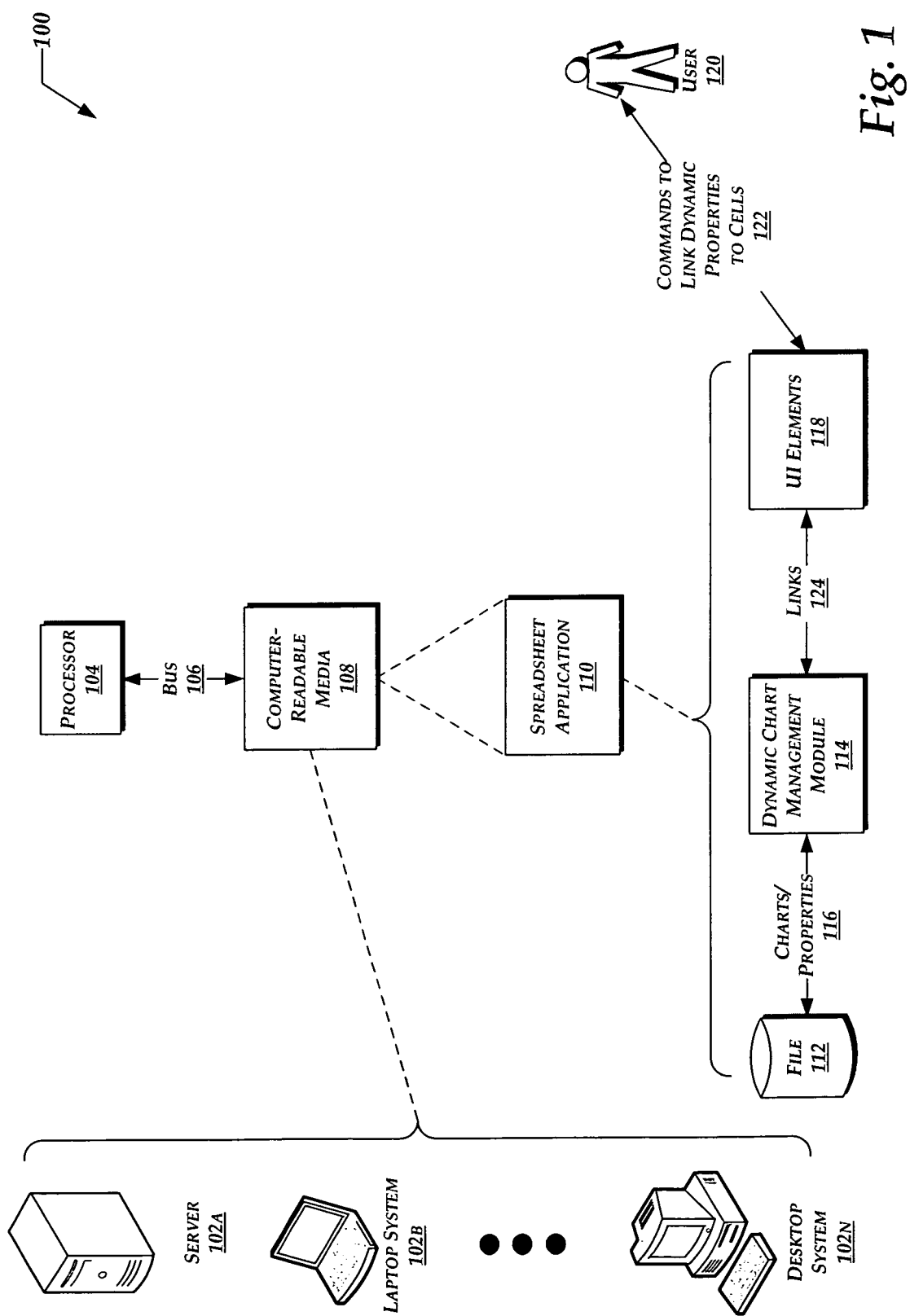
FIG. 1 is a combined block and flow diagram illustrating systems or operating environments that enable linking visual properties of charts to cells within tables.

The following detailed description is directed to technologies for linking visual properties of chart to cells within tables. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of tools and techniques for linking visual properties of chart data to cells within tables will be described.

FIG. 1 illustrates systems or operating environments, denoted generally at 100, that enable linking visual properties of chart data to cells within the tables. These systems 100 may include one or more server systems 102a, one or more portable, notebook, or laptop computing systems 102b, and/or one or more relatively stationary desktop computing systems 102n (collectively, systems 102). Although FIG. 1 illustrates these examples of various computing systems, the description herein may be implemented with other types of computing systems without departing from the scope and spirit of this description. More specifically, the graphical elements used in FIG. 1 to depict these various systems are chosen only to facilitate illustration, and not to limit possible implementations of the description herein.

Turning to the systems 102 in more detail, these systems may include one or more processors 104, which may have a particular type or architecture, chosen as appropriate for particular implementations. The processors 104 may couple to one or more bus systems 106 chosen for compatibility with the processors 104.

The systems 102 may also include one or more instances of computer-readable storage media 108, which couple to the bus systems 106. The bus systems may enable the processors 104 to read code and/or data to/from the computer-readable storage media 108. The media 108 may represent storage elements implemented using any suitable technology, including but not limited to semiconductors, magnetic materials, optics, or the like. The media 108 may include memory components, whether classified as RAM, ROM, flash, or other types, and may also represent hard disk drives.

The storage media 108 may include one or more modules of instructions that, when loaded into the processor 104 and executed, cause the systems 102 to perform various techniques for linking visual properties of chart data to cells within the tables. For example, the computer-readable media 108 may include a spreadsheet application 110. In turn, the spreadsheet application 110 may load one or more spreadsheet files 112 from storage, which may or may not be the same as the storage media 108. In addition, the spreadsheet application may include a module 114 that provides for dynamically managing properties associated with chart representations of information contained in the spreadsheets. FIG. 1 generally represents at 116 these charts and related properties associated with these charts.

The spreadsheet application 110 may, when executed, present one or more user interface (UI) elements 118 to an end-user 120. Through these UI elements 118, the spreadsheet application 110 may receive commands 122 from the end-user, with these commands 122 linking various dynamic properties with cells within the spreadsheet, as described in further detail below. FIG. 1 generally represents these links at 124.

While FIG. 1 illustrates and describes examples involving spreadsheets, and related applications, implementations of this description are not limited to spreadsheets. For example, tables may contain data presentable in chart form. Presentation applications (including, but not limited to, the POWERPOINT™ application available from Microsoft), word-processing applications (including, but not limited to, the WORD™ application also available from Microsoft), or other types of applications or utilities may import this table data, and present it in chart form within those applications or utilizes. These charts, as presented within such applications, may include dynamic visual properties that may be linked to cells within the tables, as provided in this description.

Having described the overall systems in FIG. 1, the discussion now turns to a more detailed description of dynamic chart properties as linked to table elements. This discussion is now presented with FIG. 2.

Figure 2:
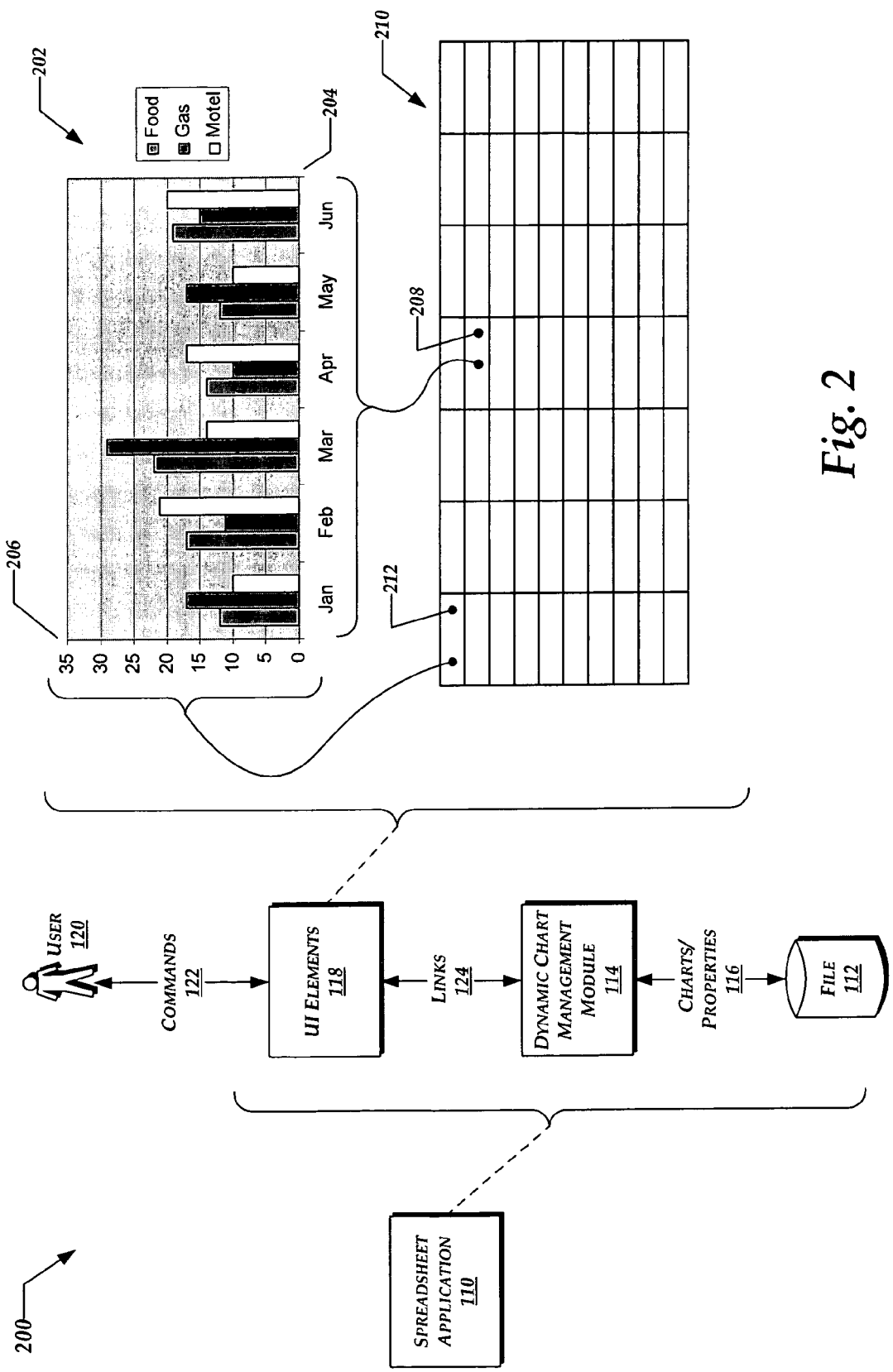
FIG. 2 is a block diagram illustrating additional aspects of dynamic chart properties as linked to table elements.

FIG. 2 illustrates additional aspects, denoted generally at 200, of dynamic chart properties as linked to table elements. For ease of reference, but not limitation, FIG. 2 may carry forward some reference numbers from previous drawings to refer to similar items. For example, FIG. 2 carries forward the file 112, representations of charts and/or properties 116, the dynamic chart management module 114, links 124 between properties within the chart and cells within the spreadsheet file, UI elements 118 depicting the chart and/or table cells, and commands 122 as issued by the user 120.

FIG. 2 illustrates an arbitrary, non-limiting example of a chart 202, which may be associated with various visually-perceptible properties. Examples of such visual properties may include, but are not limited to, minimum and/or maximum value specified for one or more axes in the chart. FIG. 2 illustrates examples of visual properties at horizontal axis 204, and at vertical axis property 206. As shown, the horizontal axis 204 may be linked so as to refer to a given cell 208 within a spreadsheet 210. For example, characteristics of the horizontal axis 204 may be defined automatically, manually, or may be specified with reference to the contents of the cell 208. The same description may apply to the vertical axis 206, which may be linked to refer to a cell 212, which may or may not be the same as the cell 208.

The cells 208 and 212 that specify various properties for the chart 202 may contain formulas, which in turn may include functions as supported already by the spreadsheet 210. In this manner, the tools and techniques described herein may enable users (e.g., 120) to tailor the properties of the chart to particular data environments, by linking these properties to particular cells within the spreadsheet. In turn, the users may program these cells as appropriate to achieve desired characteristics of particular properties, or may directly enter values into the cells to achieve these characteristics. The linked-to cells 208 and 212 may themselves depend on other cells or values specified within the spreadsheet. These cells or values may change dynamically over time as the spreadsheet is edited by users, recalculated, or the like during normal operation. In this manner, the linked-to cells 208 and 212 may enable the visual properties of the chart to evolve or change dynamically as data within the spreadsheet itself changes.

The users (e.g., 120) may define entries in the linked-to cells 208 and 212 without programming in the language in which the spreadsheet application (e.g., 110) is implemented. Typically, it is more difficult to program in the language in which the spreadsheet application is implemented, as compared to operating with the predefined functions provided by the spreadsheet application. In some cases, the users 120 may be more casual in nature, and may or may not possess the programming skills to reprogram the spreadsheet application. Accordingly, the tools and techniques described herein enable dynamic links between chart properties and spreadsheet cells using the functions and capabilities of the spreadsheet application, but without involving programming in relatively difficult programming languages. In this manner, the tools and techniques described herein (e.g., the dynamic chart management module 114) may lower the barriers to entry in making this dynamic linking capability available to a wider variety of users 120.

Custom-programmed software when added to an existing program may entail security risks, including the possibility of containing viruses or other malicious elements. The dynamic linking techniques described herein do not involve the addition of custom-programmed software, and therefore avoid these types of security risks. Instead of introducing new software and the attendant risks, the techniques described herein rely on predefined spreadsheet functions, which are relatively low risk in nature, as compared to new software written by various users 120.

Further examples of the properties or settings that may be dynamically linked to spreadsheet cells may include, but are not limited to, text labels or any chart elements that include text boxes. Scaling properties linked to cells in the spreadsheet may specify scaling factors applicable to major and/or minor units of scale within the charts.

These properties may also specify characteristics of trendlines or other visual elements appearing in a chart. For example, if a given trendline is to be expressed as a polynomial, a cell (e.g., 208 or 212) may specify the order of the polynomial. In addition, these cells may specify a name for the trendline or a curve representing the polynomial.

In cases where spreadsheets project or forecast data looking forward in time, or summarize data looking backward in time, these cells (e.g., 208 or 212) may specify how many time periods to project forwards or backwards. In some implementations, these cells may explicitly specify this number of time periods to include in such projections. In other implementations, these cells may contain formulas that, when executed, compute this number of time periods.

The linked-to cells (e.g., 208 or 212) may also specify Boolean properties. For example, dialog boxes that contain checkboxes, or other similar UI tools may link to these cells. These dialog boxes may enable users to specify whether axes in charts employ logarithmic scales, and to specify the base for such logarithmic scales.

Referenced cells (e.g., 208 or 212) may specify options for display units as presented on the axes of a chart. By default, these display units may include the actual quantities being represented in the chart. However, these linked-to cells may also specify whether to display these units in terms of 10's, 100's, 1000's, or the like. In this latter example, formulas within the linked-to cells may examine the data being represented in the chart, and determine the appropriate units in which to display this data. This examination of the charted data, and related determination of appropriate units for presenting this data, provides further examples of dynamic linking of properties within the charts.

The cells 208 or 212 may also specify how to align tick marks relative to lines representing axes within a chart. For example, entries in these cells may specify whether to place the tick marks perpendicularly to the left of an axis, to the right of the axis, or across the axis.

The foregoing examples of chart properties, which may be linked to cells within a spreadsheet, are provided only for convenience in facilitating this description. However, implementations of this description may include other examples of chart properties without departing from the scope and spirit of this description.

Having described the additional aspects of dynamic chart properties as linked to spreadsheet elements in FIG. 2, the discussion now proceeds to a description of example dialog boxes through which users may link properties to referenced or linked-to cells. This discussion is now presented with FIG. 3.

Figure 3:
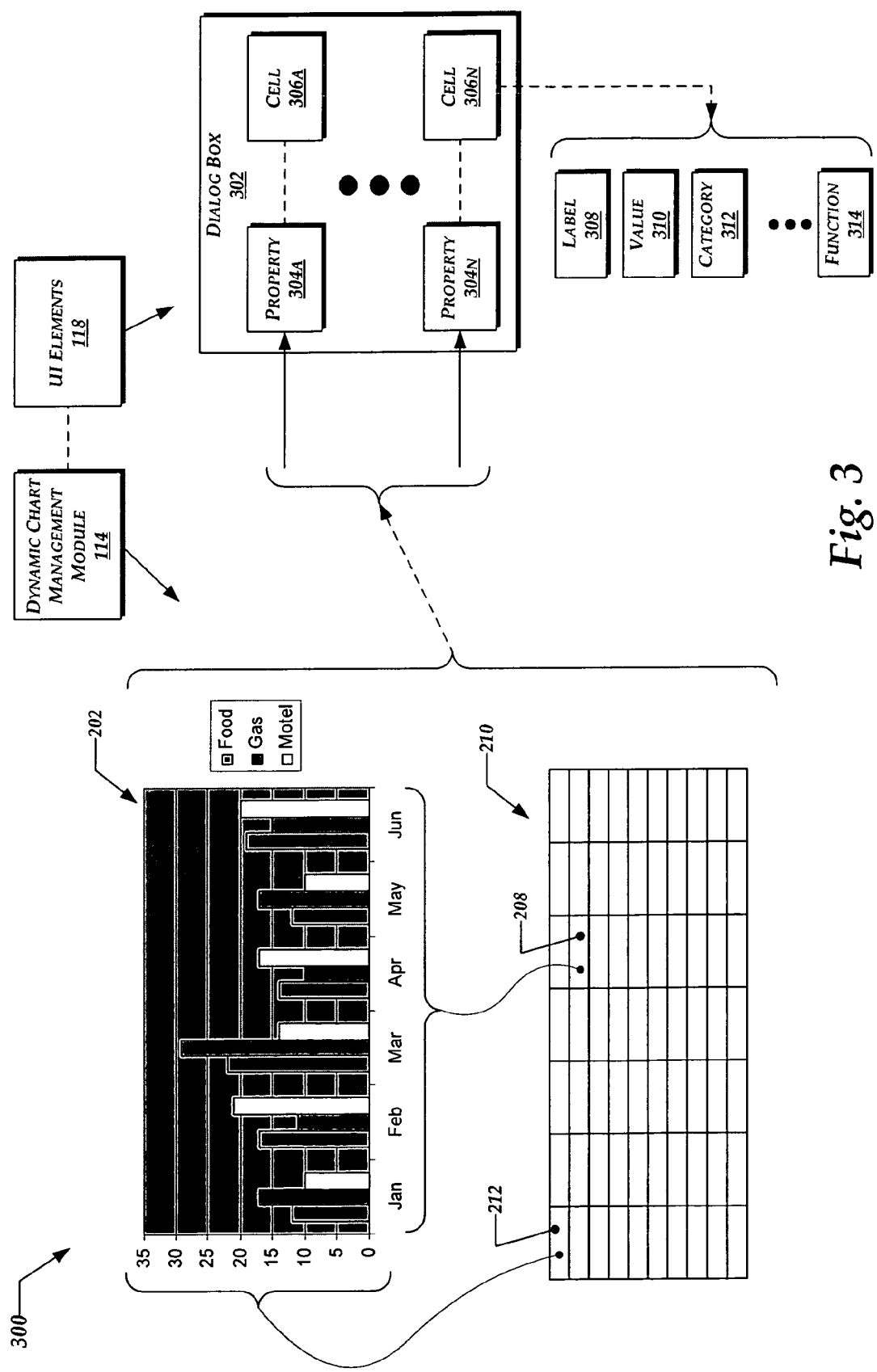
FIG. 3 is a block diagram illustrating example scenarios in which dialog boxes may enable users to link properties within a chart to one or more referenced cells.

FIG. 3 illustrates example scenarios, denoted generally at 300, in which dialog boxes may enable users to link properties within a chart to one or more referenced cells. For ease of reference and description, but not to limit possible implementations, FIG. 3 may carry forward some items from previous drawings, and label these items with similar reference numbers. For example, FIG. 3 carries forward an example chart 202, an example spreadsheet 210 with examples of referenced cells 208 and 210. In a non-limiting example shown in FIG. 3, the dynamic chart management module 114 and the UI elements 118 may enable these scenarios 300. However, other modules or components may enable these scenarios without departing from the scope and spirit of this description.

Turning to FIG. 3 in more detail, the UI elements 118 may present a dialog box 302, shown in block form in FIG. 3. The dialog box 302 may include representations of one or more properties related to the chart 202. FIG. 3 provides examples of two such property representations, denoted at 304a and 304n (collectively, property representations 304). However, implementations on the dialog box may include representations of any number of properties.

By interacting with the representations 304 of various properties within a given chart, a user (e.g., 120) may link or associate these properties with various referenced or linked-to cells (e.g., 208, 212, or the like). The dialog box 302 may include representations of such cells, as denoted at 306a and 306n (collectively, cell representations 306). For example, the cell representations 306 may include UI devices, such as drop-downs or other tools, that enable the user to link a cell within the spreadsheet (e.g., 210) with a property. FIG. 3 illustrates the property 304a as linked to the cell 306a, and the property 304n linked to the cell 306n, as represented by dashed lines within the dialog box 302.

In the foregoing manner, the contents of these referenced cells, whether these contents are explicit values or calculated formulas, may influence how the corresponding or linked properties behave within the chart 202. In addition, the contents of these referenced cells (e.g., 306n) may be extracted to serve as labels within the chart, as denoted generally at 308. In addition to such labels, contents of these referenced cells may provide values to be displayed within the chart, as denoted generally at 310. The referenced cells may also provide categories for organizing information displayed within the chart, as denoted at 312. In another example, the referenced cells may contain formulas that compute properties related to the chart, as denoted at 314.

Having described these scenarios in which dialog boxes may enable users to link properties within a chart to one or more referenced cells in FIG. 3, the discussion now turns to a description of process flows for dynamically linking properties within a charge to referenced cells. This description is now presented with FIG. 4.

Figure 4:
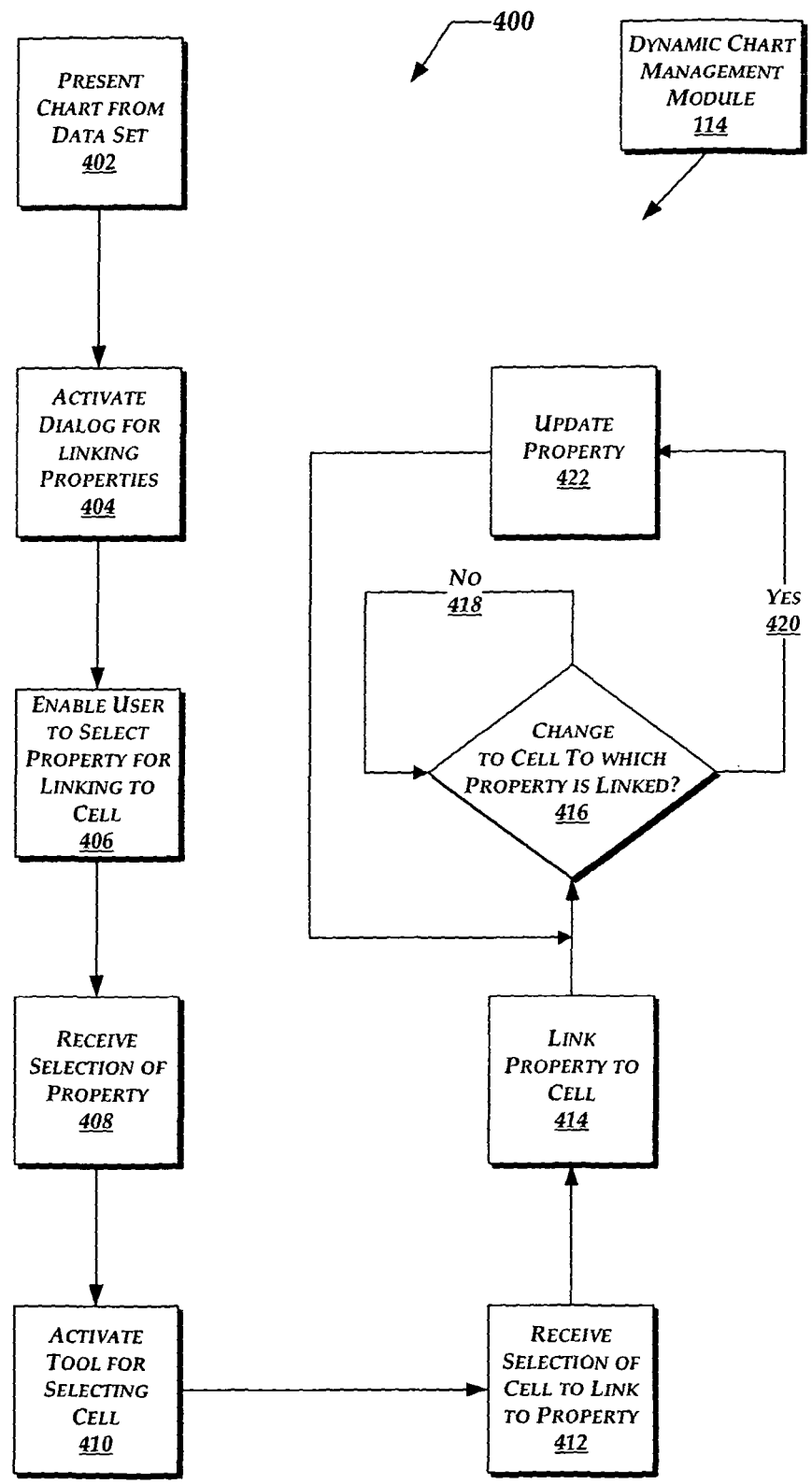
FIG. 4 is a flow diagram illustrating processes for dynamically linking properties within a chart to referenced cells.

FIG. 4 illustrates process flows, denoted generally at 400, for dynamically linking properties within a chart to referenced cells. For ease of reference, but not to limit possible implementations, the process flows 400 are described in connection with the dynamic chart management module 114. However, other components may perform at least part of the process flows 400 without departing from the scope and spirit of this description.

Turning to the process flows 400 more detail, block 402 generally represents presenting a chart that graphically depicts data extracted from a data set or file (e.g., 112 in FIG. 1). For example, block 402 may include presenting a chart such as that shown in FIGS. 2 and 3 at 202.

Block 404 generally represents activating and presenting a formatting dialog box through which the user may link one or more visual properties of the chart with cells defined within a spreadsheet. For example, block 404 may include presenting a dialog box, such as that shown in block form at 302 in FIG. 3. The dialog box presented by block 404 may include representations of various properties associated with the chart, with FIG. 3 providing examples of property representations at 304a and 304n.

Block 406 generally represents enabling a user to select one or more visual properties of a chart to link to the cell within the spreadsheet. In some implementations, block 406 may include enabling the user to explicitly enter values into the cell, with these values influencing the visual properties. In other implementations, block 406 may include enabling the user to create a formula that calculates a visual property of the chart. As examples of these latter implementations, block 406 may include enabling the user to create a formula that calculates labels or lengths of axes dynamically based upon the data represented within the chart.

Block 408 generally represents receiving input from a user selecting a property to be linked to a cell. For example, block 406 may include receiving input from a user clicking or otherwise activating some portion of a dialog box that includes a representation of a particular property. In this matter, the user may indicate which property he or she wishes to link or reference to a particular cell within a spreadsheet.

Block 410 generally represents activating a tool that enables a user to select a particular cell within the spreadsheet. More specifically, block 410 may include presenting one or more tools by which the user may link or associate properties with a contents of the particular cell. Examples of such tools may include any mechanisms by which the users may select particular cells, for example, by indicating rows and columns of such cells.

Block 412 generally represents receiving a selection of a cell to link to a particular property. As described above in FIG. 3, cells may contain different types of contents that may influence the behavior of properties within the chart. For example, these cells may include formulas that calculate chart properties based on dynamic data occurring within the spreadsheet. In other examples, these cells may specify values, labels, and/or categories that relate to particular chart properties.

Block 414 generally represents linking a property or setting associated with the chart, or other graphical display of spreadsheet data, with one or more cells that specify labels, values, categories, functions, or formulas that define or influence these properties or settings. More specifically, block 414 may include associating properties with cells, as represented in FIG. 3 by the dashed lines between property representations 304 and cell representations 306.

Decision block 416 generally represents testing whether a change has occurred within a cell to which a given property is linked. The process flows 400 may loop back to block 416 via No branch so long as no change occurs within the cell to which the given property is linked. However, when such a change occurs, the process flows 400 may take Yes branch 420 to block 422, which represents updating the visual property in response to this change. Afterwards, the process flows 400 may return to block 416 to await further changes in the cell. In this manner, the process flows 400 may enable the visual properties to adapt or update dynamically in response to changing data within a spreadsheet. In addition, while the process flows 400 are described in connection with a given property and a given cell, it is noted that implementations of these process flows may be performed concurrently for any number of given properties and cells to which these properties are linked.

For ease of description only, but not to limit possible implementations, certain flow diagrams presented herein may include data and/or process flows that are indicated as unidirectional. However, it is noted that these unidirectional representations are presented only for convenience in providing this description, and do not preclude or restrict implementations that may include bidirectional flows. In addition, implementations of the process flows described herein may proceed in orders other than those shown in the drawings without departing from the spirit and scope of this description.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. At least one computer-readable storage medium having computer-executable instructions stored thereon which, when executed by a computer, cause the computer to:
present a user interface element comprising representations of a plurality of visual formatting properties of a chart display of data contained within a table and representations of a plurality of cells in the table;
receive through the user interface element a command for linking individual visual formatting properties of the plurality of visual formatting properties to contents of selected individual cells of the plurality of cells;
in response to receiving the command, link the individual visual formatting properties to the contents of the selected individual cells such that changes to the contents of one of the selected individual cells influences a corresponding one of the visual formatting properties; and
wherein the contents of the one of the selected individual cells comprises a formula that calculates the corresponding one of the visual formatting properties and indicates whether to present the corresponding one of the individual visual formatting properties in connection with a logarithmic scale.

2. The computer-readable storage medium of claim 1, wherein the chart display is presented within a spreadsheet application.

3. The computer-readable storage medium of claim 1, wherein at least one of the individual visual formatting properties comprises a maximum or minimum value presented on at least one axis within the chart display.

4. The computer-readable storage medium of claim 1, wherein at least one of the individual visual formatting properties comprises a trendline included within the chart display.

5. The computer-readable storage medium of claim 4, wherein the contents of the one of the selected individual cells includes a custom name for the trendline.

6. The computer-readable storage medium of claim 1, wherein at least one of the individual visual formatting properties comprises a trendline represented as a polynomial curve within the chart display, and wherein the contents of the one of the selected individual cells indicates an order of the polynomial curve.

7. The computer-readable storage medium of claim 1, wherein the formula depends on at least one value specified within another cell of the plurality of cells.

8. The computer-readable storage medium of claim 1, wherein the contents of the one of the selected individual cells specifies a base for a logarithmic scale for presenting the corresponding one of the individual visual formatting properties.

9. The computer-readable storage medium of claim 1, wherein the contents of the one of the selected individual cells specifies display units for axes included within the chart display.

10. The computer-readable storage medium of claim 1, wherein the contents of the one of the selected individual cells specifies where to align at least one tick mark relative to axes included within the chart display.

11. An apparatus comprising:
a processor; and
a computer-readable storage medium having computer-executable instructions stored thereon which, when executed by a computer, cause the apparatus to
present a user interface element comprising representations of a plurality of visual formatting properties of a chart display of data contained with a table and representations of a plurality of cells in the table,
receive through the user interface element a command for linking individual visual formatting properties of the plurality of visual formatting properties to contents of selected individual cells of the plurality of cells,
in response to receiving the command, link the individual visual formatting properties to the contents of the selected individual cells such that changes to the contents of one of the selected individual cells influences a corresponding one of the individual visual formatting properties, and
wherein the contents of the one of the selected individual cells comprises a formula that calculates the corresponding one of the individual visual formatting properties and indicates whether to present the corresponding one of the individual visual formatting properties in connection with a logarithmic scale.

12. The apparatus of claim 11, wherein the formula depends on at least one value specified within another cell of the plurality of cells.

13. A computer-implemented method for linking visual properties of charts to cells within tables comprising:
- displaying a user interface element comprising representations of a plurality of visual formatting properties of a chart display of data contained within a table and representations of a plurality of cells within the table;
- receiving, through the user interface element a command for linking individual visual formatting properties of the plurality of visual formatting properties to contents of selected individual cells of the plurality of cells within the table;
- in response to receiving the command, linking the individual visual formatting properties to the contents of the selected individual cells such that changes to the contents of one of the selected individual cells influences a corresponding one of the individual visual formatting properties; and
- wherein the contents of the one of the selected individual cells comprises a formula that calculates the corresponding one of the individual visual formatting properties and indicates whether to present the corresponding one of the individual visual formatting properties in connection with a logarithmic scale.

14. The computer-implemented method of claim 13, further comprising instructions for enabling a user to create the formula within the selected one of the individual cells.

15. The computer-implemented method of claim 13, further comprising instructions for presenting the chart display to the user.

16. The computer-implemented method of claim 13, wherein the user interface element comprises a dialog box.

17. The computer-implemented method of claim 13, wherein the contents of the one of the selected individual cells specifies a base for a logarithmic scale for presenting the corresponding one of the individual visual formatting properties.

18. The computer-implemented method of claim 13, wherein the chart display is presented within a spreadsheet application.

* * * * *